Aug. 19, 1941.   C. G. VEINOTT   2,253,405
MOUNTING FOR CAPACITOR-MOTORS
Filed Dec. 13, 1939

WITNESSES:
*H. F. Susser*
*Nm. C. Groome*

INVENTOR
Cyril G. Veinott.
BY *O. B. Buchanan*
ATTORNEY

Patented Aug. 19, 1941

2,253,405

UNITED STATES PATENT OFFICE 2,253,405

MOUNTING FOR CAPACITOR-MOTORS

Cyril G. Veinott, Lima, Ohio, assignor to Westinghouse Electric & Manufacturing Company, East Pittsburgh, Pa., a corporation of Pennsylvania Application December 13, 1939, Serial No. 309.001

4 Claims. (Cl. 172—278)

My invention relates to capacitor-motors, and it has particular relation to fractional-horsepower motors such as unit-heater motors, which are motors driving a fan for blowing air through a small square heater or radiator which is adapted to be suspended from the ceiling of a large room or space to be heated, and for other purposes. My invention is a part, or possibly the culmination, of a series of improvements which have marvelously perfected these capacitor-type motors. Such motors have been developed to the point where a single motor, requiring only the simplest of adjustments in a conduit-box or terminal-board arranged at its rear end, is capable of operating, at the same speed, on either 110 volts or 220 volts; or is capable of operating at either one of two speeds, at either one of these voltages; or is capable of being connected for multi-speed service at either one of these two voltages. With such versatile motors, it is necessary for the capacitor to be associated directly with the motor, rather than with the control-equipment. It is a requisite of such motors, also, that they should operate without vibration or noise, which frequently means that some kind of cushioned suspension or support is needed, and to this end a more or less standard form, or an improved form, of resilient rubber-ring clamped mounting may be adopted.

It is an important object of my invention to provide a new design or arrangement of the capacitor-motor combination so that the motor is also extremely versatile in the way in which it can be mounted, while at the same time avoiding aerodynamic losses and certain noises which would be developed if the capacitor were placed in the air-stream, particularly if close to the near edges of the fan-blades.

Figure 1:
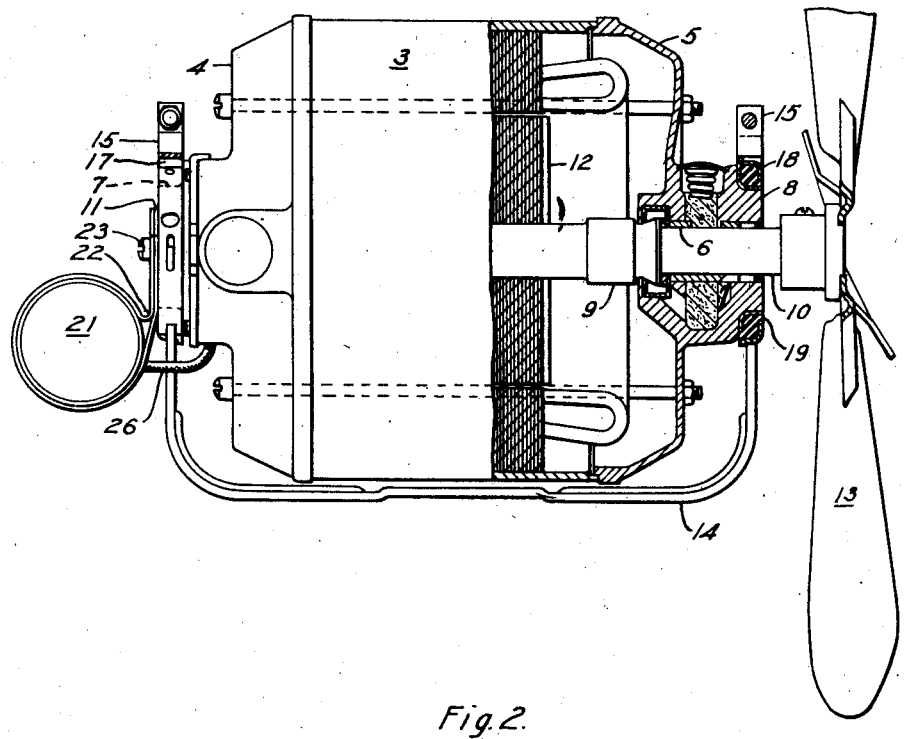
Figure 2:
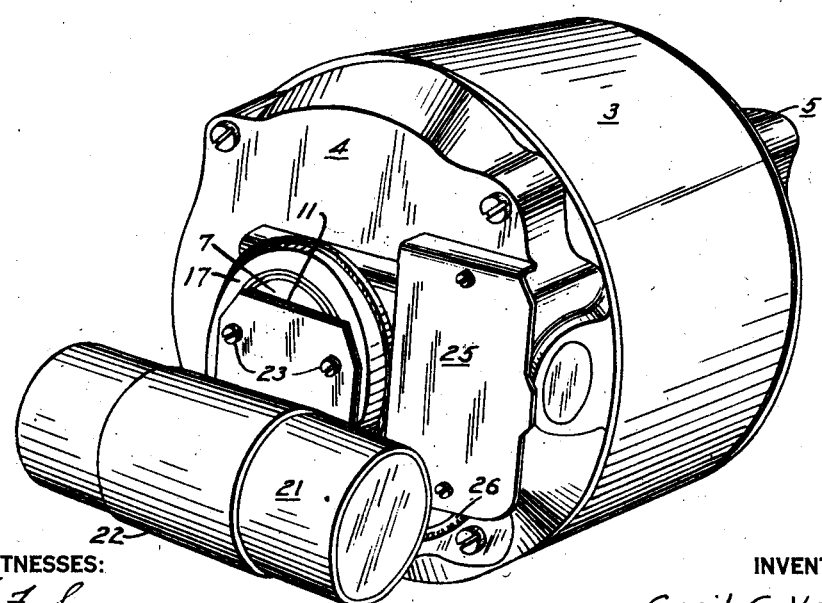

With the foregoing and other objects in view, my invention consists in the elements, combinations, methods and assemblies hereinafter described and claimed, and illustrated in the accompanying drawing, wherein Figure 1 is a view, partly in elevation, and partly in vertical section, illustrating a capacitor-motor fan embodying my novel mounting-assembly; and Fig. 2 is a perspective view of the capacitor-motor alone.

In the drawing, I show my invention as applied to a single-phase capacitor-motor comprising a stator member 3 having end-brackets 4 and 5, carrying bearings 6 which are supported in bearing-housings or protuberances 7 and 8. The bearings 6 support a rotatable shaft 9 having an extending end 10 which extends out through the bearing-protuberance 8. The other bearing-protuberance 7 has a closed flat end 11, within the motor-frame 3, the shaft 9 carries the rotor-member 12 of the motor. The outwardly extending shaft-end 10 carries a fan or blower 13.

The main body-portion of the stator-frame 3 is preferably cylindrical in its outside contour, as are also the two bearing-protuberances 7 and 8, so that any of these cylindrical contours can be engaged by an encircling clamp in order to mount the motor in any one of a plurality of different kinds of mountings, and in any one of a plurality of different positions, such as ceiling-mounting, wall-mounting or floor-mounting. It is an important feature of my invention that the motor shall be quite versatile, in this way, as to its mounting-arrangements.

The particular form of mounting which is illustrated in the drawing utilizes a floor-supported cradle or base 14 which terminates in end-clamps 15 which encircle resilient mounting-ring assemblies 17 and 18 which, in turn, encircle the respective bearing-protuberances 7 and 8. Each of the resilient mounting-ring assemblies 17 and 18 comprises a ring 19 of rubber or other flowable, yielding, solid material. The object of the rubber-ring mounting is to prevent the transmission of pulsating torques and other vibratory forces from the motor to the supporting cradle 14 or other supporting member. The particular type of rubber-ring assembly which is illustrated in the drawing constitutes the subject matter of an application of H. D. Else and myself, Serial No. 309,000, filed December 13, 1939, on Resilient mountings for motors.

The particular feature of my present invention is that I mount the capacitor 21, which is compact so as to lie within the confines of a small space or bulk, being shown as being of a cylindrical shape, by means of a capacitor-supporting bracket or fixture 22 which is attached, as by bolts 23, to the outside surface of the closed flat end 11 of the bearing-protuberance 7 at the rear end of the motor, that is, at the end opposite to the fan-end. Heretofore, the capacitor 21 has invariably been mounted in some one of several other positions around the stator-frame 3 or on the end-bracket 4, in positions where it not only interfered with the freedom and versatility of the motor-supporting means, but also interfered with the air-stream flowing axially across the outside surface of the motor and entering the fan-blades 13, from which the air is driven into the heatingelement (not shown), or for any other purpose for which the air-blast is to be utilized.

In the preferred form of embodiment of my invention, the rear end-bracket 4 is provided with a conduit-box 25 which is disposed in spaced relation to the rear-end bearing-protuberance 7, so that it does not interfere with the resilient mounting-ring assembly 17. The capacitor-terminals 26 are placed outside of the mounting-ring assembly 17 and are connected to said conduit-box as shown in Fig. 2, so that the capacitor 21 is electrically assembled as a unit with the windings of the motor, while, mechanically, the capacitor is supported from the inside of the resilient mounting-ring assembly 17, by being mounted on the end 11 of the protuberance 7 which engages the inside of said resilient mounting-ring assembly.

It will be noted, from the foregoing description, that I have provided a heretofore unconventional, but extremely valuable, mounting-arrangement for the capacitor-element 21 of a capacitor-motor, particularly a capacitor-motor which is provided with a fan 13 at the opposite end of the motor, and also particularly when applied to a capacitor-type fan-motor which is required to be extremely versatile, both as to its speed and voltage-connections, and as to its mounting-arrangements which can be adapted for a plurality of different kinds of mountings and for a plurality of different positions of the motor with respect to ceiling-mounting, wall-mounting or floor-mounting.

While I have illustrated my invention in a single preferred form of embodiment thereof, I wish it to be understood that the particular form shown is, in many respects, merely illustrative, as certain changes can obviously be made, in more or less unimportant details, by those skilled in the art, without departing from some of the essential features of my invention. I desire, therefore, that the appended claims shall be accorded the broadest construction consistent with their language and the prior art.

I claim as my invention:

1. An alternating-current rotating-shaft dynamo-electric machine of a type having a capacitor associated therewith, said capacitor being compact so as to lie within the confines of a small space or bulk, said machine having a stator-member having bearing-protuberances surrounding the shaft and projecting from the respective ends of the stator-frame, the shaft extending through the stator-frame at only one of said bearing-protuberances, the other bearing-protuberance having a substantially flat end, a mounting-ring assembly clampingly surrounding each bearing-protuberance for supporting the machine, and means for attaching the capacitor to the outside surface of the substantially flat end of said other bearing-protuberance.

2. An alternating-current rotating-shaft dynamo-electric machine of a type having a capacitor associated therewith, said capacitor being compact so as to lie within the confines of a small space or bulk, said machine having a stator-member having bearing-protuberances surrounding the shaft and projecting from the respective ends of the stator-frame, the shaft extending through the stator-frame at only one of said bearing-protuberances, the other bearing-protuberance having a substantially flat end, a resilient mounting-ring assembly surrounding each bearing-protuberance for supporting the machine, a support having a clamping member surrounding each resilient mounting-ring assembly, each resilient mounting-ring assembly comprising a ring of a flowable, yielding solid-material, and means for attaching the capacitor to the outside surface of the substantially flat end of said other bearing-protuberance.

3. A capacitor-motor comprising, in combination, a rotating-shaft single-phase motor having a capacitor associated therewith, said capacitor being compact so as to lie within the confines of a small space or bulk, said motor having a stator-member having a first end-bracket and a second end-bracket, a first bearing-protuberance and a second bearing-protuberance surrounding the shaft and projecting from the respective end-brackets of the stator-frame, the shaft extending through only the first bearing-protuberance, the second bearing-protuberance having a substantially flat end, a conduit-box carried by the second end-bracket in spaced relation to said second bearing-protuberance, means for supportingly attaching the capacitor to the outside surface of the substantially flat end of the second bearing-protuberance, and electrical connections from said capacitor to said conduit-box.

4. The invention as defined in claim 3, in combination with a resilient mounting-ring assembly surrounding each bearing-protuberance for supporting the motor, and a support having a clamping-member surrounding each resilient mounting-ring assembly, each resilient mounting-ring assembly comprising a ring of a flowable, yielding solid-material, said electrical connections passing outside of the associated clamping member.

CYRIL G. VEINOTT.